United States Patent
Schott et al.

(10) Patent No.: US 10,981,312 B2
(45) Date of Patent: Apr. 20, 2021

(54) INJECTION UNIT FOR A MOLDING MACHINE

(71) Applicant: ENGEL AUSTRIA GmbH, Schwertberg (AT)

(72) Inventors: Guenter Schott, St. Valentin (AT); Florian Porod, St. Valentin (AT)

(73) Assignee: ENGEL AUSTRIA GMBH, Schwertberg (AT)

( * ) Notice: Subject to any disclaimer, the term of this patent is extended or adjusted under 35 U.S.C. 154(b) by 78 days.

(21) Appl. No.: 16/180,325

(22) Filed: Nov. 5, 2018

(65) Prior Publication Data

US 2019/0134869 A1     May 9, 2019

(30) Foreign Application Priority Data

Nov. 7, 2017 (AT) ............................. A 50936/2017

(51) Int. Cl.
| | | |
|---|---|---|
| *B29C 45/62* | (2006.01) | |
| *B29C 45/17* | (2006.01) | |
| *B29C 45/60* | (2006.01) | |

(52) U.S. Cl.
CPC .............. B29C 45/62 (2013.01); B29C 45/17 (2013.01); B29C 45/60 (2013.01)

(58) Field of Classification Search
CPC ......... B25C 45/62; B25C 45/17; B25C 45/60; B29C 48/251; B29C 48/2511; B29C 48/2513; B29C 48/2517; B29C 48/59; B29C 48/595; B29C 48/61; B29C 48/62; B29C 48/625

USPC ......................................................... 425/557
See application file for complete search history.

(56) References Cited

U.S. PATENT DOCUMENTS

| | | | |
|---|---|---|---|
| 4,708,622 A | 11/1987 | Hehl | |
| 4,731,005 A | 3/1988 | Hehl | |
| 4,877,389 A * | 10/1989 | Hehl | ....................... B29C 45/17 |
| | | | 425/190 |
| 6,435,853 B1 * | 8/2002 | Teraoka | .............. B29C 44/3446 |
| | | | 425/208 |

FOREIGN PATENT DOCUMENTS

| | | |
|---|---|---|
| CN | 103568207 | 2/2014 |
| DE | 36 05 219 | 8/1987 |
| DE | 255 128 | 3/1988 |
| EP | 0 314 942 | 5/1989 |
| JP | 5-80726 | 11/1993 |

* cited by examiner

*Primary Examiner* — Francisco W Tschen
*Assistant Examiner* — Guy F Mongelli
(74) *Attorney, Agent, or Firm* — Wenderoth, Lind & Ponack, L.L.P.

(57) ABSTRACT

An injection unit for a molding machine includes a plasticizing cylinder having at least two grooves, and a carrier part having a notch. The plasticizing cylinder is arranged in the notch. The at least two grooves are spaced apart axially from each other. At least two engaging elements are provided, which engage with the at least two grooves, in order to create a positive-locking connection between the plasticizing cylinder and the carrier part, through which an axial movement of the plasticizing cylinder relative to the carrier part is inhibited.

21 Claims, 4 Drawing Sheets

INJECTION UNIT FOR A MOLDING MACHINE

BACKGROUND OF THE INVENTION

1. Field of the Invention

The present invention concerns an injection unit for a molding machine with a plasticizing cylinder and a carrier part, and a process for producing a plasticizing cylinder.

2. Description of the Related Art

Molding machines can preferably be injection molding machines, but transfer molding machines, presses or the like are also imaginable.

A plasticizing cylinder is also referred to as a mass cylinder.

The required injection pressure, for example in an injection molding process, can be achieved by pressing a plasticizing screw with great force into the plasticizing cylinder, and thus exerting the required pressure on the mass pad. Through this force, the plasticizing cylinder is subjected to tension, and elongation in axial direction occurs. This makes it necessary to lock the plasticizing cylinder relative to a carrier part.

This locking can be achieved by means of a groove and an engaging element, which avoids an axial movement of the plasticizing cylinder relative to the carrier part.

In known embodiments of prior art, as shown for example in EP 0314942 A1, a groove is formed on the plasticizing cylinder. This groove is mostly produced as a one-sided milling (or formation of a notch which extends at a right angle to the axis of the plasticizing cylinder). In this notch or groove, an engaging element is then inserted, which, through a negative mold to the groove or notch, engages with the plasticizing cylinder or groove, and thus creates a positive-locking connection between the engaging element and the plasticizing cylinder. This engaging element, in turn, is mounted on the carrier part by a fastening means, and thus inhibits axial movement of the plasticizing cylinder relative to the carrier part. Such a fastening means, which fastens the engaging element to the carrier part, can, for example, be designed as a screw connection.

Since in most cases an inner diameter of the plasticizing cylinder is specified when dimensioning, because the inner diameter is specified on the basis of a given injection capacity and a given injection pressure, only the outer diameter of the plasticizing cylinder can be changed when designing such a groove. Since it is important to keep the overall length of such a connection between plasticizing cylinder and carrier part as short as possible, it is known and common practice in the prior art to design one single groove. So the outer diameters of the plasticizing cylinder are becoming increasingly larger, or the materials used for a plasticizing cylinder increasingly more expensive, as they have to withstand higher loads, because the injection pressures and injection capacities are constantly increasing.

The disadvantage of this is that manufacturing costs are constantly increasing as the outer diameters increase and increased material expenditure is required, and/or materials are used which can be exposed to increased stresses, which in turn mean higher costs. A further alternative is the use of the so far known materials and a complex after-treatment of these by processes to increase the resistance. However, these processes also again mean increased costs.

SUMMARY OF THE INVENTION

The object of this invention is to specify an injection unit and a process for producing a plasticizing cylinder, which, with respect to the prior art, has a smaller outer diameter with at least approximately constant injection force and/or injection capacity.

With regard to the injection unit, this object is solved by the characteristics disclosed below. This is done by the plasticizing cylinder having at least two grooves being axially spaced from each other, and at least two engaging elements being provided, which engage with the at least two grooves in order to form a positive-locking connection between the plasticizing cylinder and the carrier part, whereby an axial movement of the plasticizing cylinder relative to the carrier part is inhibited.

In and of itself, experts strive to keep the overall length of molding machines as short as possible. However, it has turned out that by reducing the outer diameter, which can be achieved by the second groove, the advantages (e.g. in terms of material expenditure) outweigh the disadvantages.

Advantageous embodiment versions of the invention are defined by the dependent claims.

In general, details of geometric dimensions and ratios in this disclosure are to be understood as dimensions and ratios in a non-deformed state (without force application). In other words, the dimensions and ratios mentioned could also be referred to as manufacturing data. Depending on the material used and the force applied to the components, elastic and in part also plastic deformations will occur during operation, whereby these deformations will lead to changes in dimensions and ratios.

It may be particularly preferably provided that the at least two grooves are arranged together on one side of the carrier part facing away from an injection side of the plasticizing cylinder. This allows the injection force and/or the nozzle contact force to be transferred via the at least two grooves between the carrier part and the plasticizing cylinder.

In the present disclosure, the formulation "that a first quantity X stands in relation to a second quantity Y in a ratio of Z" is to be understood as "X:Y=Z".

Accordingly, the formulation "that a first quantity X stands to a second quantity Y in a ratio of $Z_1$ to $Z_2$" is to be understood as a range for which "X:Y=$Z_1$ to X:Y=$Z_2$" applies.

Preferably it can be provided that the engaging elements are formed by at least two half-shells. It may also be provided that more shells than only two engage around the circumference of at least two grooves. By dividing the shells or engaging elements, the engaging element can be easily mounted or dismounted on the plasticizing cylinder.

It is particularly preferably provided that the at least two grooves on the plasticizing cylinder are designed to be partially or completely circumferential. Here it is preferably provided that the at least two engaging elements engage at least partially, preferably completely, circumferentially in the at least two grooves.

In a preferred embodiment version, it is provided that at least one of the at least two grooves has a groove cross-section, at least two groove side walls and a groove base, wherein the at least two groove side walls, viewed in the groove cross-section, each transition into the groove base with at least one transition curvature, and wherein the groove base in the groove cross-section is at least partially designed as a curvature, wherein the curvature of the groove base differs from the transition curvatures of the groove side walls. When designing the cross-section of the groove, a relatively small depth of the groove and relatively large curvatures for the transitions from the side walls to the groove base can be achieved, which in themselves represent conflicting requirements. The effect of the invention—namely the reduction of the outer diameter—can thus be even further enhanced.

This is because the reduced depth reduces the influence of the notch, which the at least one groove represents. The curvatures reduce the notch effect. Overall, the effect of pulling or compressive forces in the area of at least one groove on the plasticizing cylinder results in reduced stresses. This allows material to be saved and/or higher permissible loads on the plasticizing cylinder can be achieved.

It may preferably be provided that a radius of an imaginary curvature circle at at least one point of the curvature of the groove base has a finite value greater than zero, which differs from a radius of an imaginary curvature circle at at least one point of the transition curvatures of the transitions.

It can also be advantageously provided that at least a first of the at least two groove side walls has an angle of 70° to 170°, preferably 80° to 160°, with respect to a surface of the plasticizing cylinder. It is particularly preferably provided that this angle is designed 90° or rectangular, or 130° to 140° to the surface of the plasticizing cylinder. It may preferably be provided that a second of the at least two groove side walls has an angle of 70° to 110°, preferably 80° to 100°, and particularly preferably 90°, with respect to a surface of the plasticizing cylinder.

It may also be particularly preferably provided that several grooves with such a groove geometry are provided next to each other, and have a distance to each other which can correspond to at least one groove width, preferably two or four times the groove width. The number of grooves required can be calculated using the groove depth (side wall length or also contact length between the plasticizing cylinder and the engaging element) of the forces to be transmitted and the maximum permissible stress based on the materials used. Preferably it is provided here that the outer diameter of the plasticizing cylinder to the groove depth is in a ratio of 6 to 18, preferably in a ratio of 8 to 16, and particularly preferably in a ratio of 10 to 14. It may also preferably be provided that the outer diameter of the plasticizing cylinder to the groove base diameter is in a ratio of 1 to 1.5, preferably in a ratio of 1.1 to 1.3. It is particularly preferably provided that the outer diameter of the plasticizing cylinder to the groove width is in a ratio of 4 to 11, preferably in a ratio of 6 to 9.

In a preferred embodiment version it may be provided that the outer diameter of the plasticizing cylinder to a pitch of the at least two grooves is in a ratio of 3 to 8 to each other, preferably in a ratio of 4.5 to 6.5. In this case, the pitch indicates the measure which is present between at least two grooves, and at which a feature of the groove (periodically) repeats itself.

It is particularly preferably provided that at least one transition curvature of the at least two groove side walls transitions tangentially into the curvature of the groove base. A tangent is here to be understood as an imaginary straight-lined section in the point of transition normal to the imaginary line of the transition point to the center point of the curvature. This straight-lined section in turn forms the tangent, which is normal to the imaginary straight-lined section of the transition point of the curvature of the groove base and its center point. It may be particularly preferably provided that at least one of the transition curvatures of the at least two groove side walls transitions tangentially into the groove base or the curvature of the groove base.

It is preferably provided that the transition curvatures are designed as transition radii. Thereby it can preferably be provided that the at least one transition radius of a first groove side wall to at least one transition radius of a second groove side wall of the at least two groove sides walls is in a ratio of 0.1 to 1, preferably in a ratio of 0.2 to 0.8, and particularly preferably in a ratio of 0.55 to 0.65.

So it can be advantageous, for example, if a pulling force is initiated into the plasticizing cylinder through one groove side wall, and a compressive force is initiated into the plasticizing cylinder through the other groove side wall, the at least one transition radius of the pull side being designed smaller than the at least one transition radius of the push side. Thereby the groove side wall, at which a compressive force is exerted, has the transition radius of the pull side, because due to the compressive force at the groove side wall a bending moment is generated, which consequently results in a pulling force at the groove base or more precisely at the transition radius. In the same way, the groove side wall, on which a compressive stress is exerted, has the transition radius of the push side.

It is preferably provided that an outer diameter of the plasticizing cylinder to the at least one transition radius of a first groove side wall of the at least two groove side walls is in a ratio of 20 to 50, preferably in a ratio of 30 to 40.

It is particularly preferably provided that an outer diameter of the plasticizing cylinder to the at least one transition radius of a second groove side wall of the at least two groove side walls is in a ratio of 15 to 30, preferably in a ratio of 19 to 23.

Preferably it is provided that the curvature of the groove base is designed as a radius. It is particularly preferably provided that a ratio between the greater of the amount of at least one transition radius of a first groove side wall and at least one transition radius of a second groove side wall on the one hand, and the value of the radius of the groove base on the other hand, is 0.25 to 0.8, is preferably 0.35 to 0.5, and is particularly preferably 0.38 to 0.45. Thus, the applicant's tests have shown that the provision of a larger radius of the groove base with respect to the radii of the at least two groove side walls and their transitions to the groove base causes optimum force transmission in the plasticizing cylinder.

It may preferably be provided that an outer diameter of the plasticizing cylinder to the radius of the groove base is in a ratio of 5 to 20, preferably in a ratio of 7 to 10.

It is also preferably provided that the radius of the groove base has a finite value greater than zero, which differ from the transition radii of the transitions.

With regard to the process for manufacturing a plasticizing cylinder for a molding machine, this is done by the characteristics disclosed below. Thereby, the process for manufacturing comprises at least the following steps:

specification of a desired pulling or compressive force which can be transferred non-destructively with the plasticizing cylinder, selection of a suitable material for the plasticizing cylinder, specification of a suitable groove geometry, wherein the at least one groove has a groove cross-section, at least two groove side walls and a groove base, wherein the at least two groove side walls, viewed in the groove cross-section, each transition into the groove base with at least one transition curvature, wherein the groove base wall in the groove cross-section is designed at least partially as a curvature, wherein the curvature of the groove base differs from the transition curvatures of the groove side walls, specification of the minimum outer diameter of the plasticizing cylinder resulting from the desired pulling or compressive force of the selected material and the determined groove geometry, at least in the area of the mounting of the plasticizing cylinder on a carrier part, production of a plasticizing cylinder with a specified outer diameter and a specified groove geometry from a specified material.

Hereby, by a non-destructive transmission of the pulling or compressive force is meant not only a transmission of the forces at which no failure of the plasticizing cylinder or the engaging elements occurs, but also a transmission at which no permanent or plastic deformations of the plasticizing cylinder or the at least two engaging elements occur. Preferably, a fatigue strength of the plasticizing cylinder or the engagement elements can also be understood here.

It is preferably provided here that the plasticizing cylinder is subjected to a coating process. Such a coating process allows the surface of a plasticizing cylinder to be prepared for use when it is manufactured. In this way a surface can be protected against corrosion or, for example, made more robust against damage such as scratches. It can also be provided that a foreign material is applied to a base material by build-up welding.

Preferably it can also be provided that the plasticizing cylinder is subjected to a process to change the material properties. Just as an example, reference is made here to a process such as nitriding or the use of alloys.

It can be particularly preferably provided that the plasticizing cylinder is manufactured by means of a forming process. Thus, it can be advantageous with an exemplary embodiment, if the plasticizing cylinder is produced by a forging process. Deep rolling, ball bombardment or nailing can also give the surface of the plasticizing cylinder particularly favorable hardness and/or strength properties. This/ these treatment(s) can be carried out at different temperatures (e.g. ambient temperature or workpiece temperature).

It may be preferably provided that the plasticizing cylinder is manufactured by means of a machining process.

Thus, for example, it can be provided that a previously treated workpiece (which, for example, was cast) is brought to an oversize (final dimension/final shape plus a small tolerance upwards) by a machining process (such as for example turning). In a further step, this exemplary workpiece can be subjected to a surface treatment process, wherein the surface layers of the workpiece are hardened either by nitriding and/or hardening and/or plastic deformation. In a further step, the workpiece can then be brought to its final dimension by a machining process (such as turning or grinding). In order to increase the product life of the workpiece or the product life of the resulting plasticizing cylinder, a coating process can additionally also be applied.

BRIEF DESCRIPTION OF THE DRAWINGS

Different embodiments of the invention result from the figures as well as the corresponding figure description. Thereby shows.

DETAILED DESCRIPTION OF THE INVENTION

Figure 1:
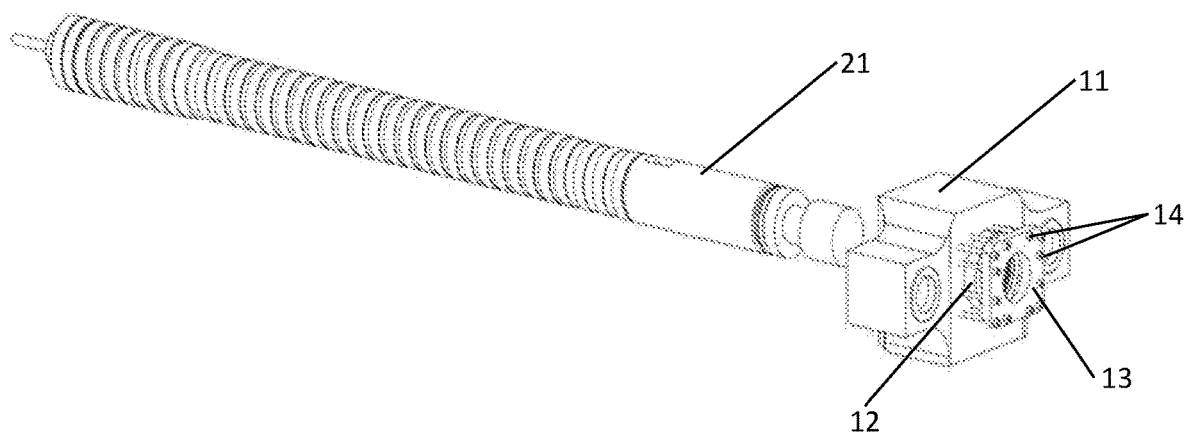
FIG. 1 a perspectival illustration of an exemplary embodiment of an injection unit according to invention, FIG. 2 an embodiment of an injection unit according to the invention in cross-section, FIG. 3a-3c exemplary embodiments of a groove of the at least two grooves, and FIG. 4 an exemplary arrangement of the at least two grooves.

FIG. 1 shows a perspective illustration of an embodiment version of an injection unit according to the invention. Here the plasticizing cylinder 21 is shown in a position exposed by the carrier part 11 in order to ensure better visualization. The plasticizing cylinder 21 shows at least two grooves, which are connected to the half-shells 12 in a mounted state. These half-shells 12 thereby carry out the function of the engaging element, and engage with the at least two grooves of the plasticizing cylinder 21. The half-shells 12 contact the carrier part 11 with their front side, and are secured against radial displacement by the clamping screws 14. These clamping screws 14 carry a pressure plate 13 on the carrier part 11. Thereby, the pressure plate 13 presses the plasticizing cylinder 21 and the half-shells 12 against the carrier part 11 by the force exerted by the clamping screws 14 via the groove connection.

Figure 2:
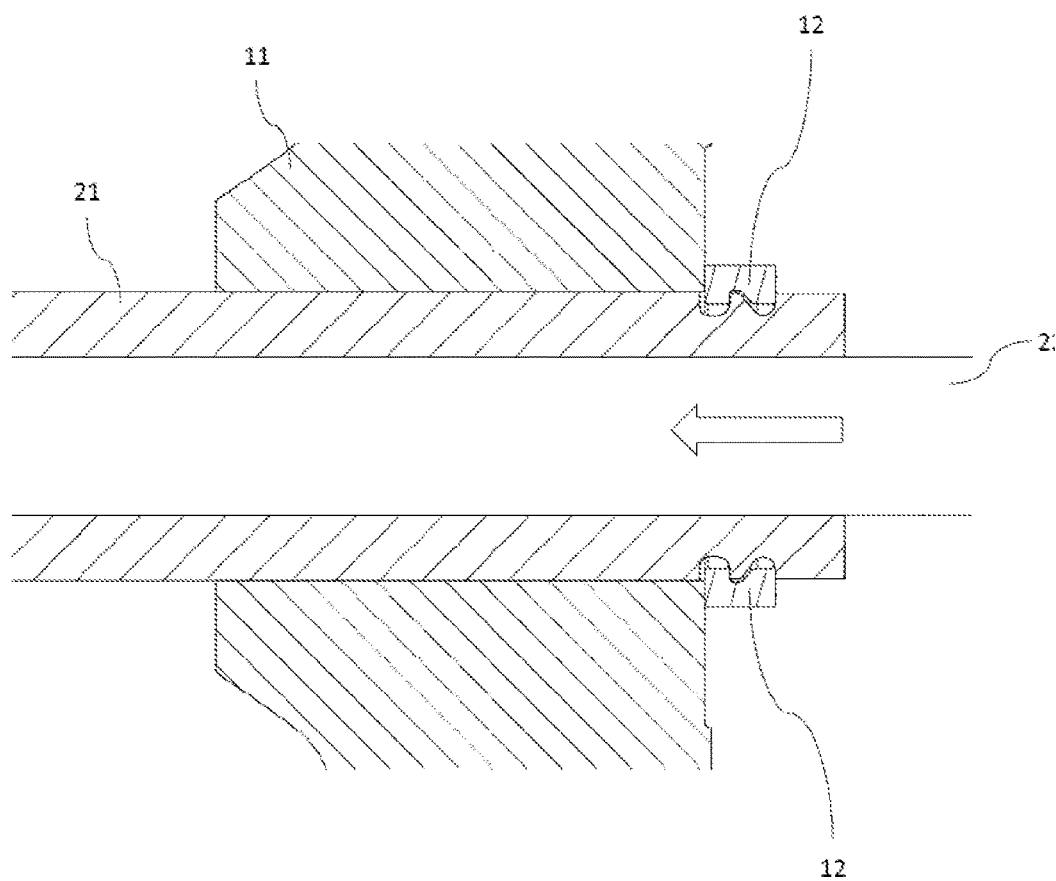

FIG. 2 shows an embodiment of an injection unit according to the invention in cross-section in assembled state, more precisely the embodiment of FIG. 1 in assembled state in cross-section. It is clearly visible how the two half-shells 12 engage with the at least two grooves of the plasticizing cylinder 21, and contact the carrier part 11 with their front side. The at least two grooves have a geometry specifically adapted to the transmission of the compressive forces that occur on the at least two grooves during injection. A radial displacement of the half-shells 12 with respect to the plasticizing cylinder 21 is prevented by the clamping screws 14. These clamping screws 14 connect the carrier part 11 with a pressure plate 13, which is fastened to a collar of the plasticizing cylinder 21. Through this pressure plate 13 and the clamping screws 14, compressive forces are transferable between plasticizing cylinder 21 and carrier part 11. In the interior of the plasticizing cylinder 21, which has a pipe-shaped design, the plasticizing screw 22 of the plasticizing unit is arranged.

In this embodiment it is provided that the at least two grooves are arranged on one and the same side. This side, on which the at least two grooves are arranged, represents a side of the support part 11 facing away from an injection side of the plasticizing cylinder 21. In this way the injection force and/or the nozzle contact force (here illustrated by the arrow) is transferred via the at least two grooves between the carrier part 11 and the plasticizing cylinder 21.

Figure 3A:
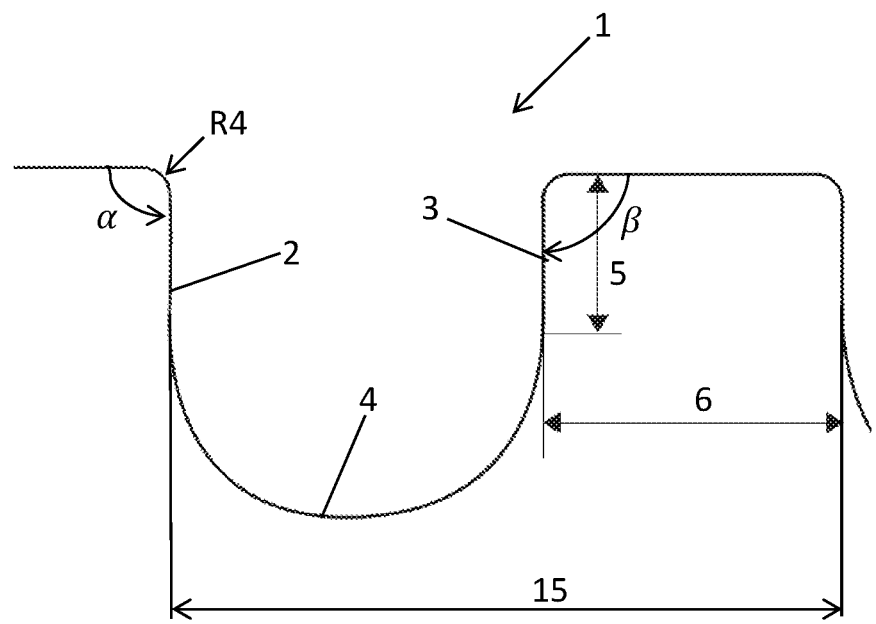
Figure 3B:
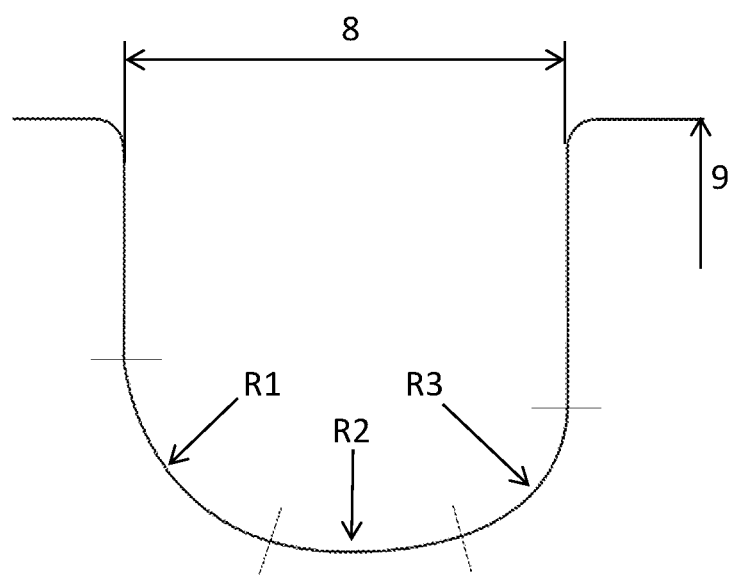
Figure 3C:
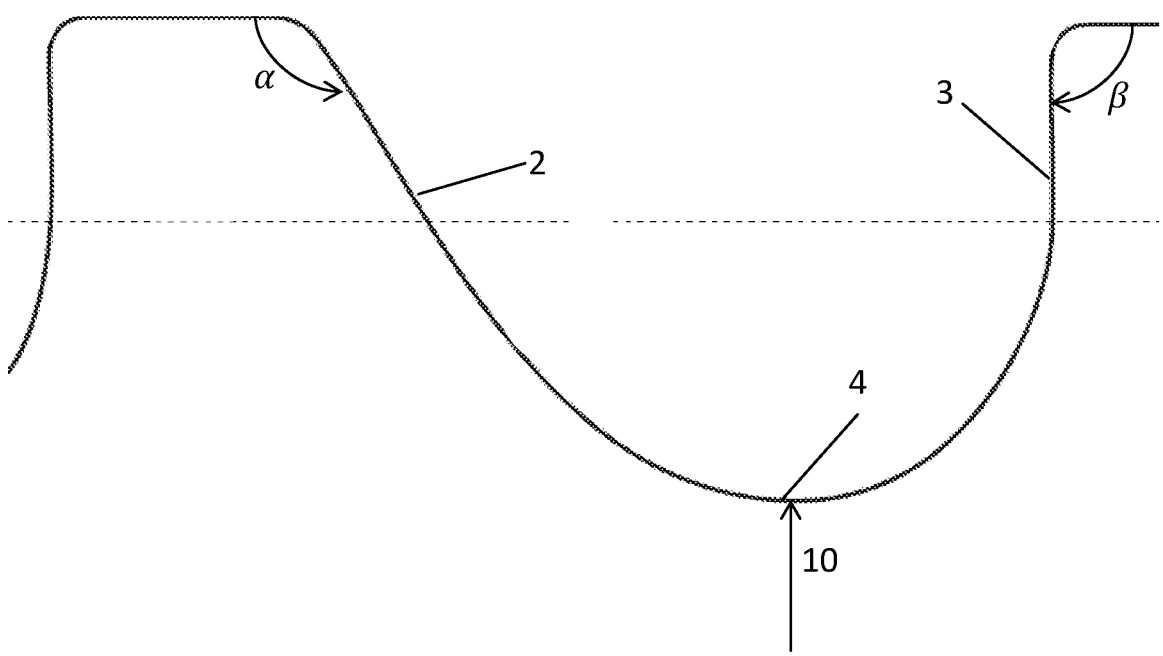

FIGS. 3a to 3c show an exemplary embodiment of at least one groove 1 of the at least two grooves of a plasticizing cylinder 21. The groove 1 is designed by two groove side walls 2, 3 and a groove base 4. Here it can be clearly seen that the groove side wall 2 initially extends at a right angle α from the surface of the plasticizing cylinder 21 in the direction of the groove base 4, which leads tangentially into the transition curvature, which in this embodiment is designed as transition radius R1. This transition radius R1 subsequently leads tangentially into the curvature of the groove base 4, which in this exemplary embodiment is designed as radius R2. The groove base 4, designed by the radius R2, leads tangentially into the second transition curvature, which is designed as transition radius R3, which in turn transitions tangentially into the groove side wall 3. The groove side walls 2, 3 shown in this embodiment are chamfered at their transition to the surface of the plasticizing cylinder 21 by a radius R4. Depending on the force of the plasticizing cylinder 21 to be transmitted, the side wall length 5 can be adjusted or more than two grooves 1 can be provided with a distance of 6 to each other. The groove 1 has a pitch 15 to at least one second groove 1 (which in FIG. 3*a* is only indicated).

In the figures it is clearly visible that the design of the groove base 4 as radius R2 allows to reduce the notch effect by the transition radii without this causing a significant deepening of the groove 1.

FIG. 3*c* shows a detailed view of a groove 1 of another embodiment version. Here, compared with FIG. 3*a* or 3*b*, the groove side wall 2 is inclined at an angle α to the surface of the plasticizing cylinder 21. By means of such a design, the incline of the groove side wall 2 can be used to achieve optimum force transmission. Thus, this groove side wall 2, which is inclined by the angle α, can serve as the pull side when in use, and the groove side wall 2 as the push side. The groove 1, as shown in FIG. 3*a*, has a distance of 6, so that the groove 1 shown with respect to a possibly additional groove provided, is spaced apart by the distance of 6. Furthermore, the groove width 8 and the outer diameter 9 of the plasticizing cylinder 21 can be seen in FIG. 3*b*. FIG. 3*c* furthermore shows a groove base diameter 10, which represents the smallest diameter of the plasticizing cylinder 21, and can therefore be regarded as a critical cross-section.

Figure 4:
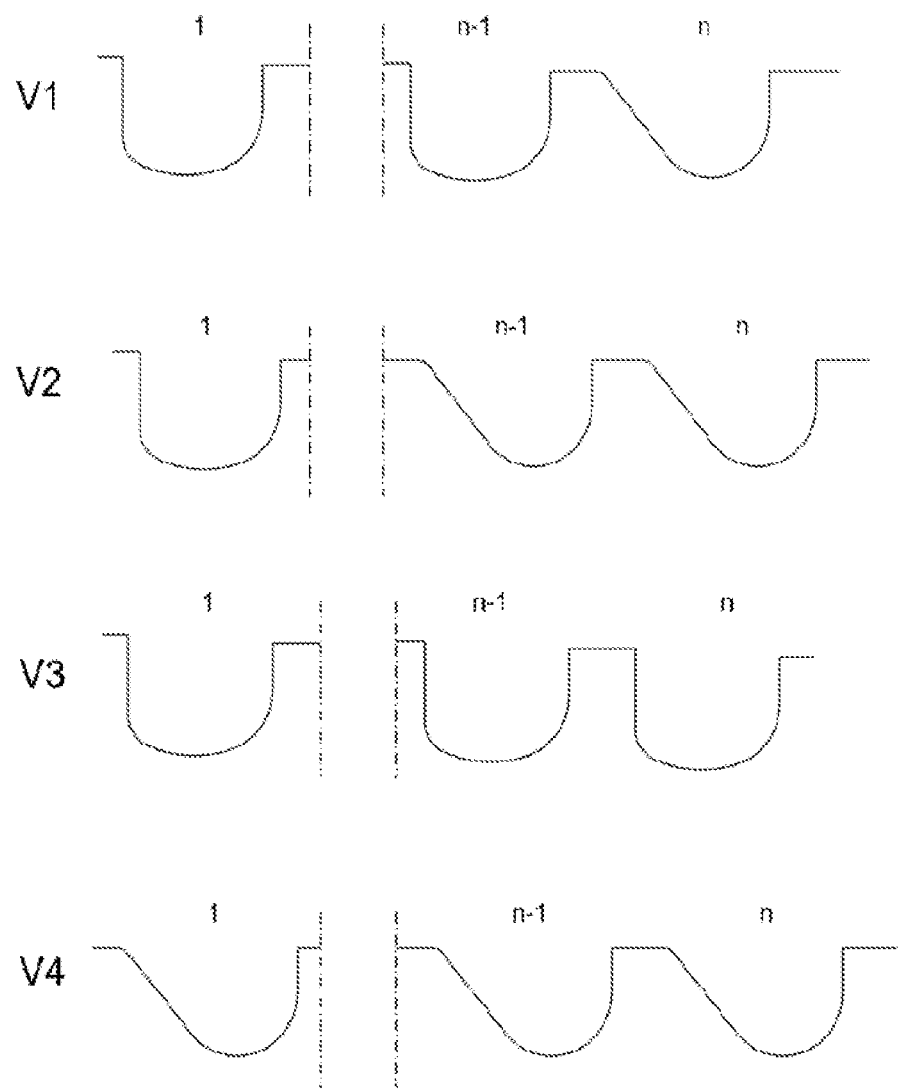

FIG. 4 shows exemplary arrangements of the at least two grooves. Thus it can be seen that if at least two grooves are arranged, the individual grooves may have different groove cross-sections. For example, it may be provided that—as shown in version 1—a first groove is designed with a groove geometry, as shown through FIG. 3*a, b*, and a last groove of the arrangement of the at least two grooves is designed with a saw tooth profile. The grooves arranged between the first and last groove—if more than two grooves are provided—can also be designed by a groove profile as shown with FIG. 3*a*. However, the grooves lying in between, as shown by the version V2, can also be designed with a saw tooth profile. It is also possible that all provided grooves, as shown by version V3, have a groove geometry, as shown by FIG. 3*a*, or, as shown by version V4, that all provided grooves have a saw tooth profile.

LIST OF REFERENCE SIGNS

1 groove
2 groove side wall
3 groove side wall
4 groove base
5 side wall length
6 distance
8 groove width
9 outer diameter
10 groove base diameter
11 carrier part
12 half-shells
13 pressure plate
14 clamping screws
15 pitch
21 plasticizing cylinder
22 plasticizing screw
α angle
β angle
R1 transition radius
R2 radius
R3 transition radius
R4 radius
V1 version 1
V2 version 2
V3 version 3
V4 version 4

The invention claimed is:

1. An injection unit for a molding machine, the injection unit comprising:
    a plasticizing cylinder having at least two grooves; and
    a carrier part having a notch,
    wherein:
    the plasticizing cylinder is arranged in the notch;
    the at least two grooves are spaced apart axially from each other in a longitudinal direction along which the plasticizing cylinder extends through the notch; and
    at least two engaging elements are provided, which engage with the at least two grooves, in order to create a positive-locking connection between the plasticizing cylinder and the carrier part, through which an axial movement of the plasticizing cylinder relative to the carrier part is inhibited.

2. The injection unit according to claim 1, wherein the at least two engaging elements engage opposite sides of the plasticizing cylinder.

3. The injection unit according to claim 1, wherein the at least two grooves are at least partially circumferential.

4. The injection unit according to claim 1, wherein the at least two engaging elements engage at least partially circumferentially with the at least two grooves.

5. The injection unit according to claim 1, wherein:
    at least one of the at least two grooves has a groove cross section, a first groove side wall, a groove base, and a second groove side wall;
    the first groove side wall, viewed in the groove cross section, transitions with at least one first transition curvature into the groove base;
    the second groove side wall, viewed in the groove cross section, transitions with at least one second transition curvature into the groove base;
    the groove base in the groove cross-section at least partially has a curvature; and
    the curvature of the groove base differs from the at least one first transition curvature and the at least one second transition curvature.

6. The injection unit according to claim 5, wherein a radius of an imaginary curvature circle at at least one point of the curvature of the groove base has a finite value greater than zero, which differs from a radius of an imaginary curvature circle at at least one point of the at least one first transition curvature or the at least one second transition curvature.

7. The injection unit according to claim 5, wherein at least the first groove side wall or the second groove side wall, with respect to a surface of the plasticizing cylinder, has an angle (α) of 70 to 170 degrees.

8. The injection unit according to claim 5, wherein the first groove side wall or the second groove side wall, with respect to a surface of the plasticizing cylinder, has an angle (β) of 70 to 110 degrees.

9. The injection unit according to claim 5, wherein the at least one first transition curvature or the at least one second transition curvature transitions tangentially into the groove base.

10. The injection unit according to claim 5, wherein a ratio of at least one transition radius of the first groove side wall to at least one transition radius of the second groove side wall is 0.1 to 1.

11. The injection unit according to claim 5, wherein a ratio of an outer diameter of the plasticizing cylinder to at least one transition radius of the first groove side wall is 20 to 50.

12. The injection unit according to claim 5, wherein a ratio of an outer diameter of the plasticizing cylinder to at least one transition radius of the second groove side wall is 15 to 30.

13. The injection unit according to claim 5, wherein a ratio of: (i) a greater of at least one transition radius of the first groove side wall, and at least one transition radius of the second groove side wall; and (ii) a radius of the groove base is 0.25 to 0.8.

14. The injection unit according to claim 5, wherein a ratio of an outer diameter of the plasticizing cylinder to a radius of the groove base is 5 to 20.

15. The injection unit according to claim 5, wherein a radius of the groove base has a finite value greater than zero, which differs from transition radii of the first groove side wall and the second groove side wall.

16. The injection unit according to claim 5, wherein a ratio of an outer diameter of the plasticizing cylinder to a diameter of the groove base is 1 to 1.5.

17. The injection unit according to claim 5, wherein the at least one first transition curvature or the at least one second transition curvature transitions tangentially into the curvature of the groove base.

18. The injection unit according to claim 1, wherein a ratio of an outer diameter of the plasticizing cylinder to a pitch of one of the at least two grooves is 3 to 8.

19. The injection unit according to claim 1, wherein a ratio of an outer diameter of the plasticizing cylinder to a width of one of the at least two grooves is 4 to 11.

20. The injection unit according to claim 1, wherein the at least two grooves are completely circumferential.

21. The injection unit according to claim 1, wherein the at least two engaging elements engage completely circumferentially with the at least two grooves.

* * * * *